United States Patent
Batzinger et al.

(10) Patent No.: US 10,012,552 B2
(45) Date of Patent: Jul. 3, 2018

(54) SYSTEMS AND METHODS FOR MONITORING COMPONENT STRAIN (71) Applicant: General Electric Company, Schenectady, NY (US)

(72) Inventors: Thomas James Batzinger, Burnt Hills, NY (US); Bryan J. Germann, Greenville, SC (US); William F. Ranson, Columbia, SC (US)

(73) Assignee: General Electric Company, Schenectady, NY (US)

( * ) Notice: Subject to any disclaimer, the term of this patent is extended or adjusted under 35 U.S.C. 154(b) by 184 days.

(21) Appl. No.: 14/948,736

(22) Filed: Nov. 23, 2015

(65) Prior Publication Data

US 2017/0146411 A1 May 25, 2017

(51) Int. Cl.
*G01L 1/14* (2006.01)
*G01L 1/12* (2006.01)
*G01M 5/00* (2006.01)
*G01B 7/16* (2006.01)
*G01L 1/22* (2006.01)

(52) U.S. Cl.
CPC ............ *G01L 1/144* (2013.01); *G01B 7/16* (2013.01); *G01L 1/12* (2013.01); *G01L 1/127* (2013.01); *G01L 1/2287* (2013.01); *G01M 5/0016* (2013.01); *G01M 5/0033* (2013.01); *G01M 5/0041* (2013.01); *G01M 5/0083* (2013.01); *G01M 5/0091* (2013.01)

(58) Field of Classification Search
CPC ........ G01L 1/144; G01L 1/12; G01M 5/0033; G01M 5/0083; G01M 5/0091
USPC .......................................................... 73/780
See application file for complete search history.

(56) References Cited

U.S. PATENT DOCUMENTS

| 4,528,856 A * | 7/1985 | Junker | G01B 7/24 |
| | | | 324/209 |
| 4,746,858 A * | 5/1988 | Metala | G01N 27/9046 |
| | | | 324/200 |
| 4,782,705 A * | 11/1988 | Hoffmann | G01B 7/24 |
| | | | 338/32 H |
| 4,859,062 A | 8/1989 | Thurn et al. | |
| 5,936,411 A | 8/1999 | Jacobsen et al. | |
| 6,078,396 A | 6/2000 | Manzouri | |

(Continued)

FOREIGN PATENT DOCUMENTS

WO WO 2014/031957 2/2014

OTHER PUBLICATIONS

European Search Report; Application No. 16200201.8; Date of Completion of the Search: Feb. 14, 2017 (Munich, Germany); dated Feb. 22, 2017.

*Primary Examiner* — Lisa Caputo
*Assistant Examiner* — Nathaniel T Woodward
(74) *Attorney, Agent, or Firm* — Dority & Manning, P.A.

(57) ABSTRACT

A system for monitoring a component is provided. The system may include a strain sensor configured on the component, an electrical field scanner for analyzing the strain sensor, and a processor in operable communication with the electrical field scanner. The processor may be operable for measuring an electrical field value across the strain sensor along a mutually-orthogonal X-axis and Y-axis to obtain a data point set. The processor may further be operable for assembling a field profile of the strain sensor based on the data point set. Methods of using the system are also provided.

20 Claims, 4 Drawing Sheets (56) References Cited

U.S. PATENT DOCUMENTS

| | | | |
|---|---|---|---|
| 6,175,644 B1 | 1/2001 | Scola et al. | |
| 6,574,363 B1 | 6/2003 | Classen et al. | |
| 6,983,659 B2 | 1/2006 | Soechting et al. | |
| 6,986,287 B1 * | 1/2006 | Dorfman | G01B 7/18 |
| | | | 73/776 |
| 7,107,706 B1 * | 9/2006 | Bailey, Sr. | A43B 3/0005 |
| | | | 36/29 |
| 7,200,259 B1 | 4/2007 | Gold et al. | |
| 7,227,648 B2 | 6/2007 | Weinhold | |
| 7,414,732 B2 | 8/2008 | Maidhof et al. | |
| 7,421,370 B2 | 9/2008 | Jain et al. | |
| 7,441,463 B2 * | 10/2008 | Fallah-Rad | G01M 5/0008 |
| | | | 73/773 |
| 7,477,995 B2 | 1/2009 | Hovis et al. | |
| 7,490,522 B2 * | 2/2009 | Ruehrig | G01L 1/12 |
| | | | 73/862.335 |
| 7,509,884 B2 * | 3/2009 | Morimoto | G01L 1/205 |
| | | | 73/862.628 |
| 7,533,818 B2 | 5/2009 | Hovis et al. | |
| 7,689,003 B2 | 3/2010 | Shannon et al. | |
| 7,697,966 B2 | 4/2010 | Monfre et al. | |
| 8,245,578 B2 | 8/2012 | Ranson et al. | |
| 8,511,182 B2 | 8/2013 | Bjerge et al. | |
| 8,600,147 B2 | 12/2013 | Iliopoulos et al. | |
| 8,943,897 B2 | 2/2015 | Beauvais et al. | |
| 8,994,845 B2 | 3/2015 | Mankowski | |
| 9,128,063 B2 * | 9/2015 | Dooley | G01N 3/066 |
| 9,200,889 B2 | 12/2015 | Swiergiel et al. | |
| 9,207,154 B2 | 12/2015 | Harding et al. | |
| 9,311,566 B2 | 4/2016 | Iliopoulos et al. | |
| 9,316,571 B2 | 4/2016 | Müller et al. | |
| 9,394,853 B2 | 7/2016 | Shipley et al. | |
| 2007/0062300 A1 | 3/2007 | Dorfman | |
| 2008/0105059 A1 * | 5/2008 | Turnbull | D07B 1/145 |
| | | | 73/779 |
| 2009/0188324 A1 * | 7/2009 | Gregory | G01B 7/16 |
| | | | 73/773 |
| 2011/0184664 A1 * | 7/2011 | Ranson | G01B 11/16 |
| | | | 702/42 |
| 2012/0017703 A1 * | 1/2012 | Ikebe | B25J 13/083 |
| | | | 73/862.626 |
| 2013/0013224 A1 | 6/2013 | Ito et al. | |
| 2013/0194567 A1 | 8/2013 | Wan et al. | |
| 2013/0202192 A1 | 8/2013 | Telfer et al. | |
| 2014/0000380 A1 | 1/2014 | Slowik et al. | |
| 2014/0267677 A1 | 9/2014 | Ward, Jr. et al. | |
| 2015/0239043 A1 | 8/2015 | Shipper, Jr. et al. | |
| 2016/0161242 A1 | 6/2016 | Cook et al. | |
| 2016/0313114 A1 | 10/2016 | Tohme et al. | |
| 2016/0354174 A1 * | 12/2016 | Demir | A61B 90/06 |

* cited by examiner

SYSTEMS AND METHODS FOR MONITORING COMPONENT STRAIN

FIELD OF THE INVENTION

The present disclosure relates generally to systems and methods for monitoring component strain, and more particularly to systems and methods which provide electrical field measurements and scans of strain sensors positioned on the component.

BACKGROUND OF THE INVENTION

Throughout various industrial applications, apparatus components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of a turbomachine, various components within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, it is desirable to monitor components for creep. One approach to monitoring components for creep is to configure strain sensors on the components, and analyze the strain sensors at various intervals to monitor for deformations associated with creep strain. However, such deformation can in many cases be on the order of 0.01% of an original dimension, thus requiring specialized equipment for strain monitoring.

For instance, specialized equipment may be used to obtain visual images of the strain sensors, and compare the dimensions of the strain sensors in images taken at varying times for an associated component. Typically, dimensions along two axes can be directly measured in such images, while dimensions along a third axis may be inferred. However, such approaches generally require a direct line of sight to the sensor and component. A great deal of space and disassembly may be required in order to measure the component. As a result, in situ measurements can be difficult, if not impossible with most existing systems.

Accordingly, alternative systems and methods for monitoring component strain are desired in the art. In particular, systems and methods that require less space and permit in situ measurements to be made on an assembled apparatus.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a system for monitoring a component is provided. The system may include a strain sensor configured on the component, an electrical field scanner for analyzing the strain sensor, and a processor in operable communication with the electrical field scanner. The processor may be operable for measuring an electrical field value across the strain sensor along a mutually-orthogonal X-axis and Y-axis to obtain a data point set. The processor may further be operable for assembling a field profile of the strain sensor based on the data point set.

In accordance with another embodiment of the present disclosure, a method for monitoring a component is provided. The method may include the step of measuring an electrical field value across a strain sensor configured on the component along a mutually-orthogonal X-axis and Y-axis to obtain a first data point set. The method may further include the step of assembling a first field profile of the strain sensor based on the first data point set.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
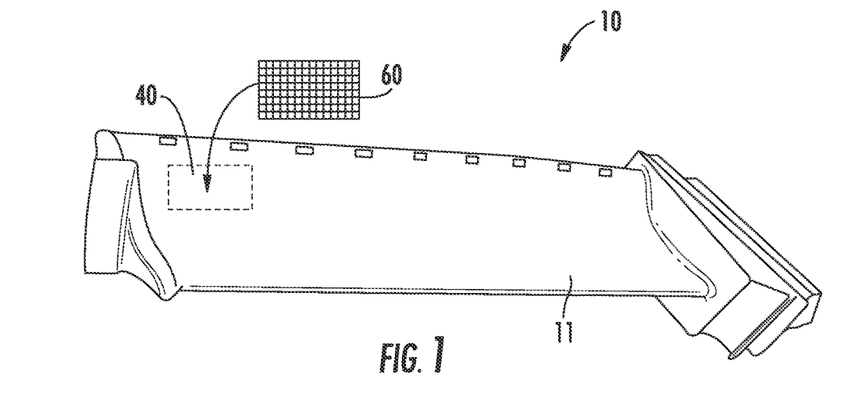
FIG. 1 is a perspective view of an exemplary component including an electrical field scanner and strain sensor in accordance with one or more embodiments of the present disclosure.
Figure 2:
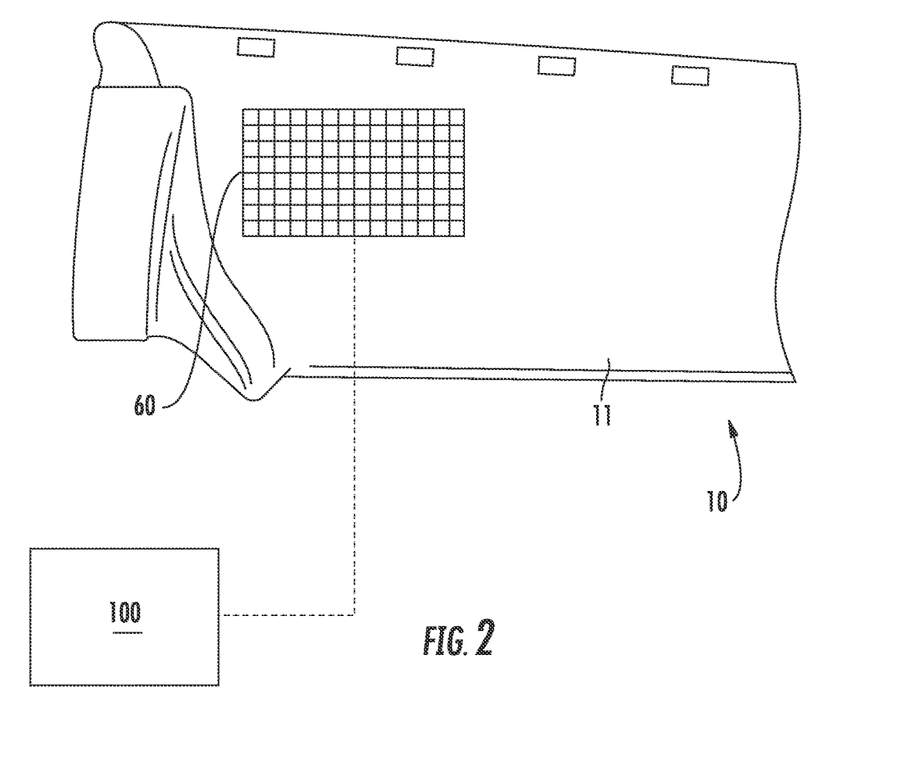
FIG. 2 is a schematic view of an exemplary component including an electrical field scanner and processor in accordance with one or more embodiments of the present disclosure.

Referring now to FIGS. 1 and 2, a component 10 is illustrated with a strain sensor 40 configured on a portion of the component's exterior surface 11. As shown, a field scanner 60 may be disposed over the strain sensor 40 and/or exterior surface 11. The component 10 (and more specifically the substrate 11 of the overall component 10) can comprise a variety of types of components used in a variety of different applications, such as, for example, components utilized in high temperature applications (e.g., components comprising nickel or cobalt based superalloys). In some embodiments, the component 10 may comprise an industrial gas turbine or steam turbine component such as a combustion component or hot gas path component. In some embodiments, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In some embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

Strain sensors 40 in accordance with the present disclosure may be configured on the component 10 using any suitable techniques, including deposition techniques; suitable additive manufacturing techniques; or mounting of previously-formed strain sensors 40 using suitable mounting apparatus or techniques such as adhering, welding, brazing, etc. In some embodiments, the strain sensor 40 includes a detection material configured to have a substantially distinct conductivity from the material of the component 10. For instance, in an exemplary embodiment, the component 10 is formed from a material having a first conductivity value, while the strain sensor 40 comprises a detection material having a second conductivity value that is different from the first conductivity value. In a further embodiment, the second conductivity value is greater than the first conductivity value. In certain embodiments, the detection material of the strain sensor 40 includes a relatively high conductivity material. Specifically, the strain sensor 40 may include platinum, copper, aluminum, gold, or another high conductivity metal. In optional embodiments, the detection material of the strain sensor 40 includes a relatively low conductivity material. For example, the detection material the strain sensor 40 may include tungsten or metal or ceramic material having a low conductivity.

Figure 3:
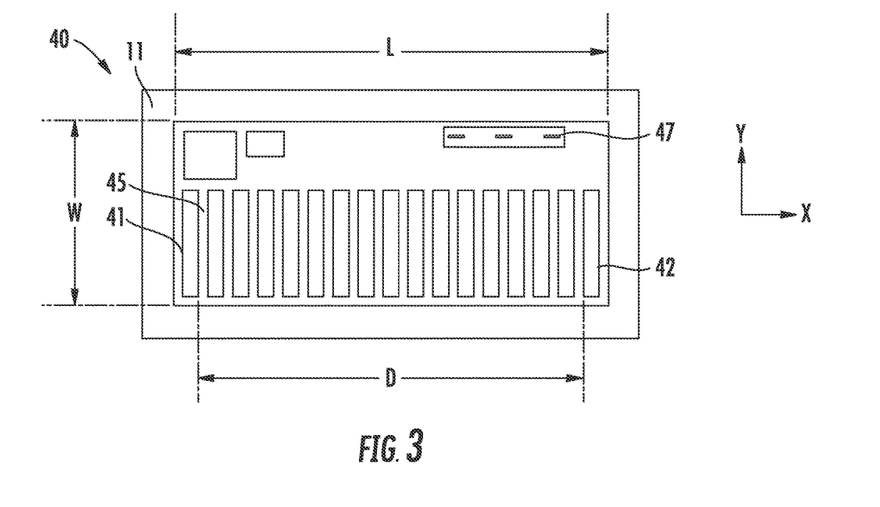
FIG. 3 is an overhead view of an exemplary strain sensor embodiment in accordance with one or more embodiments of the present disclosure.

Referring now to FIGS. 1 through 3, an exemplary embodiment of a strain sensor 40 is configured on a portion of the exterior surface 11 of the component 10. The example component 10 embodiment shown in FIG. 1 comprises a turbine component including a turbine blade. However, the component 10 can include various additional or alternative components, as described above. As illustrated an electrical field scanner 60 may be selectively placed over and/or in contact with the strain sensor 40 to analyze the strain sensor 40. A processor 100 may be in operable communication with the electrical field scanner 60 to measure an electrical field value across the strain sensor 40, as will be described below.

The strain sensor 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the component 10. The at least two reference points 41 and 42 can be disposed at a variety of distances and in a variety of locations depending on the specific component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The strain sensor 40 may comprise a variety of different configurations and cross-sections such as by incorporating a variety of differently shaped, sized, and positioned reference points 41 and 42. For example, as illustrated in FIG. 3, the strain sensor 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the component 10 by providing strain measurements across a greater variety of locations.

Furthermore, the dimensions of the strain sensor 40 may depend on, for example, the component 10, the location of the strain sensor 40, the targeted precision of the measurement, application technique, and electrical field measurement technique. For example, in some embodiments, the strain sensor 40 may comprise a length L and width W ranging from less than 1 millimeter to greater than 300 millimeters. Optionally, the length L may be between 5 and 25 millimeters, while the width W is be between 5 and 25 millimeters. Moreover, the strain sensor 40 may comprise any thickness T that is suitable for application and subsequent identification without significantly impacting the performance of the underlying component 10. For example, in some embodiments, the strain sensor 40 may comprise a thickness T ranging from less than about 0.01 millimeters to about 1 millimeter. In some embodiments, the strain sensor 40 may have a substantially uniform thickness. Such embodiments may help facilitate more accurate measurements for subsequent strain calculations between the first and second reference points 41 and 42.

In optional embodiments, the strain sensor 40 may comprise a positively applied square or rectangle wherein the first and second reference points 41 and 42 comprise two opposing sides of said square or rectangle. In some embodiments, the strain sensor 40 may comprise at least two applied reference points 41 and 42 separated by a negative space 45 (i.e., an area in which the strain sensor material is not applied). The negative space 45 may comprise, for example, an exposed portion of the exterior surface 11 of the component 10. Alternatively or additionally, the negative space 45 may comprise a subsequently-applied material that has a distinct conductivity from the material of the at least two reference points 41 and 42 (or vice versa).

As illustrated in FIG. 3, in some embodiments, the strain sensor 40 may include a unique identifier 47 (hereinafter "UID"). The UID 47 may comprise any type of barcode, label, tag, serial number, pattern or other identifying system that facilitates the identification of that particular strain sensor 40. In some embodiments, the UID 47 may additionally or alternatively comprise information about the component 10 or the overall apparatus that the strain sensor 40 is deposited on. The UID 47 may thereby assist in the identification and tracking of particular strain sensors 40, components 10 or even overall apparatuses (e.g., turbines) to help correlate measurements for past, present and future operational tracking.

The strain sensor 40 may thereby be configured in one or more of a variety of locations of various components 10. For example, as discussed above, the strain sensor 40 may be configured on a turbine blade, vane, nozzle, shroud, rotor, transition piece, or casing. In such embodiments, the strain sensor 40 may be configured in one or more locations known to experience various forces during unit operation such as on or proximate airfoils, platforms, tips or any other suitable location. Moreover, the strain sensor 40 may be deposited in one or more locations known to experience elevated temperatures. For example the strain sensor 40 may be configured on a hot gas path or combustion component 10.

In some embodiments, multiple strain sensors 40 may be configured on a single component 10 or on multiple components 10. For example, a plurality of strain sensors 40 may be configured on a single component 10 (e.g., a turbine blade) at various locations such that the strain may be determined at a greater number of locations about the individual component 10. Alternatively or additionally, a plurality of like components 10 (e.g., a plurality of turbine blades) may each have a strain sensor 40 configured in a standard location so that the amount of strain experienced by each specific component 10 may be compared to other like components 10. In even some embodiments, multiple different components 10 of the same unit (e.g., blades and vanes for the same turbine) may each have a strain sensor 40 configured thereon so that the amount of strain experienced at different locations within the overall apparatus unit may be determined.

Figure 4:
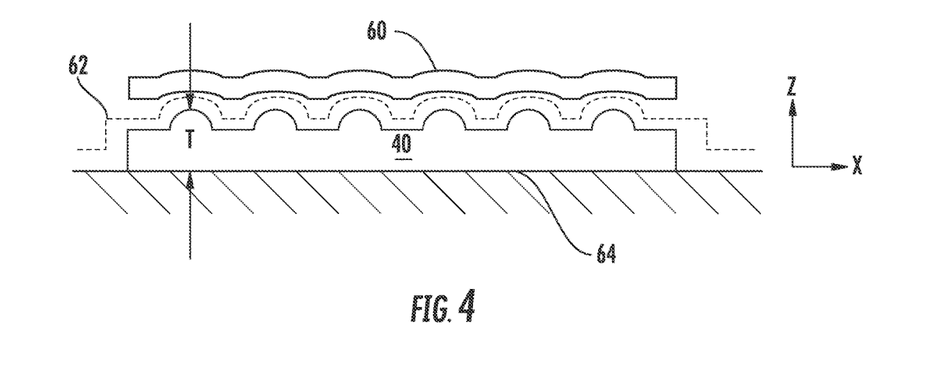
FIG. 4 is a schematic side view of an electrical field scanner disposed over a strain sensor in accordance with one or more embodiments of the present disclosure.

As shown in FIG. 4, the component 10 may include a thermal barrier coating 62. In such embodiments, the thermal barrier coating 62 may be placed over or under the strain sensor 40. In some embodiments, the strain sensor 40 may be disposed under the thermal barrier coating 62, between a base 64 of the component 10 and the thermal barrier coating 62. Optionally, the base 64 may be a superalloy base formed from one or more nickel or cobalt based superalloy. In further embodiments, the thermal barrier coating 62 may fully coat the top surface of the strain sensor 40, enclosing the strain sensor 40 between the base 64 and the thermal barrier coating 62. In still further embodiments, the strain sensor 40 may be embedded in a thermal barrier coating 62. Such embodiments of the strain sensor 40 will be fully coated by the thermal barrier coating 62 on both a top surface and a bottom surface. The electrical field scanner 60 may be configured to analyze the strain sensor 40 through the thermal barrier coating 62. During operation of such embodiments, the thermal barrier coating 62 may be arranged over the strain sensor 40 between the strain sensor 40 and the electrical field scanner 60.

Figure 5:
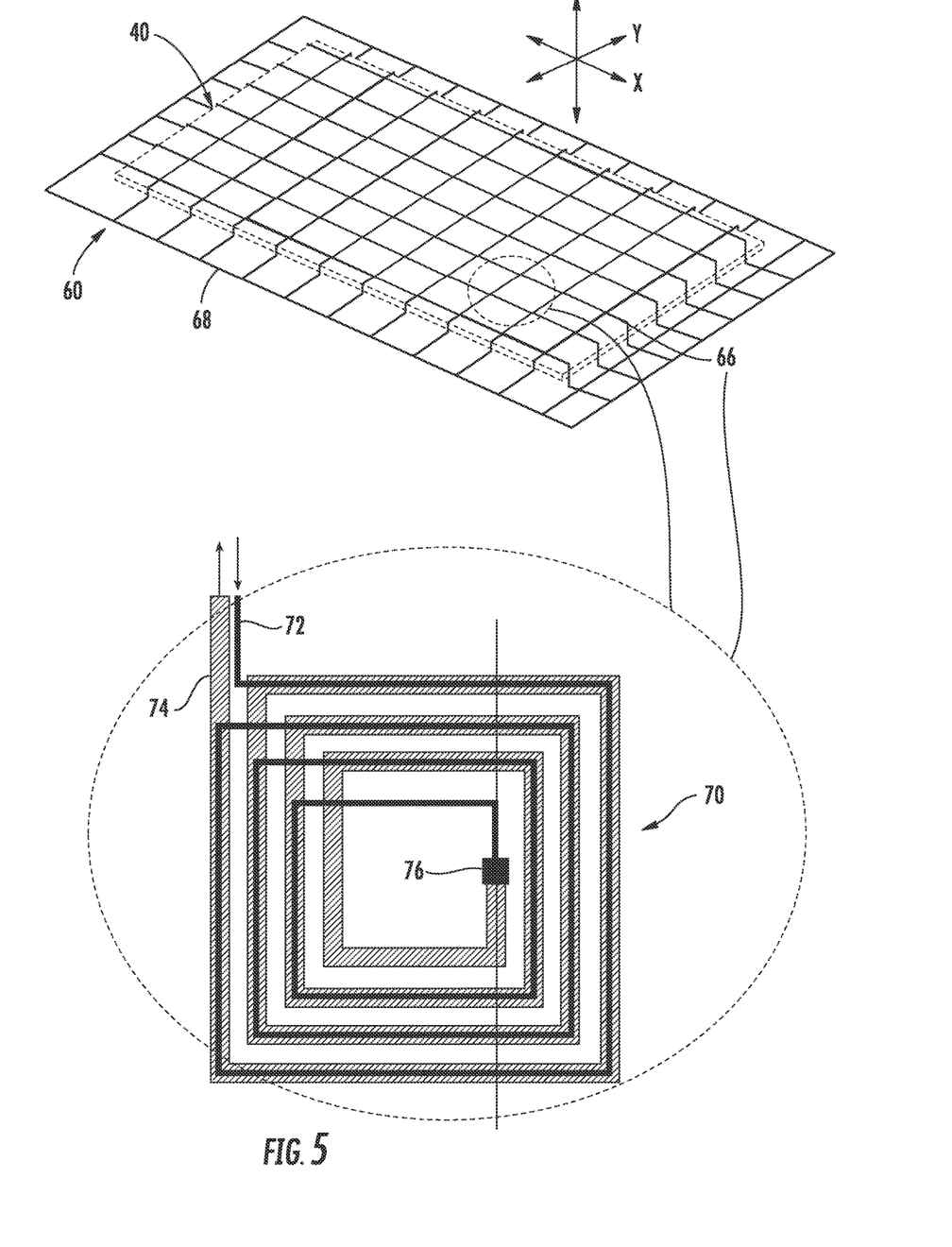
FIG. 5 is a magnified perspective view of an electrical field scanner disposed over a strain sensor in accordance with one or more embodiments of the present disclosure.

Referring to FIG. 5, the electrical field scanner 60 is configured to analyze the strain sensor 40. As illustrated, the electrical field scanner 60 may include one or more electrical probes 66. Multiple probes 66 may be joined together as a flexible matrix array 68. The flexible matrix array 68 may permit the electrical field scanner 60 to substantially conform to the shape of the component 10 and exterior surface 11. The flexible matrix array 68 may be manipulated into position over the sensor 40 in situ, without disassembly of an apparatus (e.g., turbine) or component 10. Exemplary embodiments of the electrical probes 66 include an eddy current coil 70, a Hall Effect probe, conductivity probe, and/or a capacitance probe.

As illustrated in FIGS. 4 and 5, the array 68 may be positioned over the sensor 40 and component 10 along a mutually-orthogonal X-axis and Y-axis. The array 68 may additionally be positioned parallel to the strain sensor 40 in a Z-axis orthogonal to the X and Y-axes. During use, the electrical field scanner 60 may transmit and/or receive an electrical signal to/from the strain sensor 40. Electrical signals received from the sensor 40 may then be measured by an included processor 100. In additional or alternative embodiments, the electrical field scanner 60 may be configured to measure conductivity a conductivity value (e.g., variations in conductivity) across the strain sensor 40.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 100 may also include various input/output channels for receiving inputs from and sending control signals to various other components with which the processor 100 is in communication, such as the electrical field scanner 60. The processor 100 may further include suitable hardware and/or software for storing and analyzing inputs and data from the electrical field scanner 60 and for generally performing method steps, as described herein.

In general, the processor 100 is operable for measuring the strain sensor 40 along a mutually orthogonal X-axis and Y-axis. The processor 100 may measure electrical field values from the signal along the X-axis and Y-axis to obtain a data point set. In some embodiments, the data point set may include one or both of an X-axis data point set and a Y-axis data point set. The X-axis data point set may include a plurality of X-axis data points. The Y-axis data point set may include Y-axis data point set. In some embodiments, the processor 100 is further operable for calculating one or more Z-axis data points in a Z-axis. Optionally, a plurality of Z-axis data points may be collected as part of a Z-axis data set. The X-axis data points, Y-axis data points, and Z-axis data points are dimensional data points related to the direct measurement of the strain sensor 40. For example, the data points may indicate the location of the surface in one or more axes relative to a reference surface such as the exterior surface 11 of the component 10, or relative to each other.

The processor 100 may also be operable for assembling one or more field profile based on the data set. In some embodiments, the processor 100 is further operable for assembling one or more three-dimensional profile of the strain sensor 40 based on the data point set and one or more Z-axis data point. Optionally, the three-dimensional profile may be based on based on the X-axis data point set, the Y-axis data point set, and the Z-axis data point set. Field profiles can be measured and assembled at different times for the associated component 10, such as before use in an apparatus (e.g., turbomachine) or other operational use and after a period of such use or after varying periods of such use. Dimensional differences in the profiles can then be measured and utilized in, for example, subsequent strain calculation.

Referring still to FIG. 5, an exemplary electrical field scanner 60 embodiment will be described. As shown, the exemplary scanner 60 includes a matrix array 68 having a predetermined shape and composed of a plurality of electrical field probes 66. As a matrix array 68, the electrical field scanner 60 may define the X and Y-axis relative to its overall length L and width W. In such embodiments, the Z-axis extends outward from the array 68 and toward the sensor 40 and/or component 10 above which the array 68 is placed.

Each of the probes 66 may include an eddy current coil 70 having a drive coil winding 72 and a sense coil winding 74 electrically joined by an interlayer connection 76. In certain embodiments, the drive coil winding 72 and the sense coil winding 74 may be embodied by the same coil winding structure. Generally, the drive coil winding 72 is configured to transmit an initial electromagnetic field toward the sensor 40. The sense coil winding 74 is configured to receive an opposing secondary electromagnetic field.

During use, an alternating current flow is conducted through the eddy current coil 70. The initial electromagnetic field is thereby induced at the drive coil winding 72. In reaction to the initial electromagnetic field, a reflected field will be transmitted toward and to the sense coil winding 74. After being transmitted by the drive coil winding 72, the initial electromagnetic field may also be received at the sensor 40. At the sensor 40, the initial electromagnetic field induces an eddy current through the sensor 40. The eddy current, in turn, may generate an eddy current field that alters the reflected field at the array 68. Together the eddy field and reflected field may form at least part of the secondary electromagnetic field detected by the sense coil winding 74. Once received, the secondary electromagnetic field may be measured at known points along the X-axis and Y-axis by the controller 100. Such points may correspond to the location of individual probes 66 along the array 68. In optional embodiments, the variations and overall secondary electromagnetic field strength may be utilized to calculate Z-axis data points indicative of the sensor's distance from the array 68. As mentioned, the data points may be collected into respective X-axis, Y-axis, and Z-axis data point sets.

Although an eddy current coil 70 for analyzing an eddy current field is described as an exemplary embodiment, other suitable configurations and methods may be employed. For instance, the measured electrical field may include a Hall magnetic field analyzed by a Hall Effect probe. Alternatively, the measured electrical field may include variances in capacitance analyzed by a capacitance probe. In further embodiments, the measured electrical field may include conductivity variations analyzed by one or more conductivity probe.

As also mentioned, after one or more X-axis data points and/or Y-axis data points are obtained for a strain sensor 40, a field profile of the strain sensor 40 may be assembled, such as by the processor 100, based on a data point set. For example, processor 100 may collect the data points and output a plot of all data points along relative X and Y-axes. Optional embodiments may further include a calculated Z-axis data point and/or data point set, allowing an output plot of all data points along relative, X, Y, and/or Z-axes.

Further, multiple field profiles may be compared, such as by the processor 100. For example, differences in the locations along the X-axis, the Y-axis, and (in optional embodiments) the Z-axis of various features of the strain sensor 40 between multiple profiles may be observed and measured for use in subsequent strain calculations. Further, such strain calculations may be performed.

In exemplary embodiments, each profile of a strain sensor 40 which is compared to another profile is based obtained X-axis data points and/or Y-axis data points obtained at a different time for the component 10. For example, a first field profile may be based on one or more data point sets obtained at a first time, and a second field profile may be based on one or more data point sets obtained at a second time. The first time may occur before use in an apparatus, or may occur after a certain amount of such use. The second time may occur before use in an apparatus, after use in an apparatus, or after the first time has occurred. For example, a first time may be zero, for a newly manufactured component 10, and a second time may occur after a particular period of time of service of the component 10. By measuring the strain sensor 40 at these varying times, deformation, etc. and resulting strain due to use of the component 10 in service may be calculated.

Additional or alternative embodiments of the second field profile may be obtained by a method substantially similar to or different from the first field profile. Some exemplary embodiments of the second field profile include one or more model data point sets. For instance, the second profile of some embodiments includes one or more of an X-axis data point set or a Y-axis data point set based on a model or ideal shape and/or position of the strain sensor 40. The second field profile may indicate the intended shape of the strain sensor 40 and/or the location where the strain sensor 40 should be positioned relative to the component 10. In some embodiments, a single second field profile may be used for multiple discrete components 10 (i.e., multiple units of the same type of component).

Figure 6:
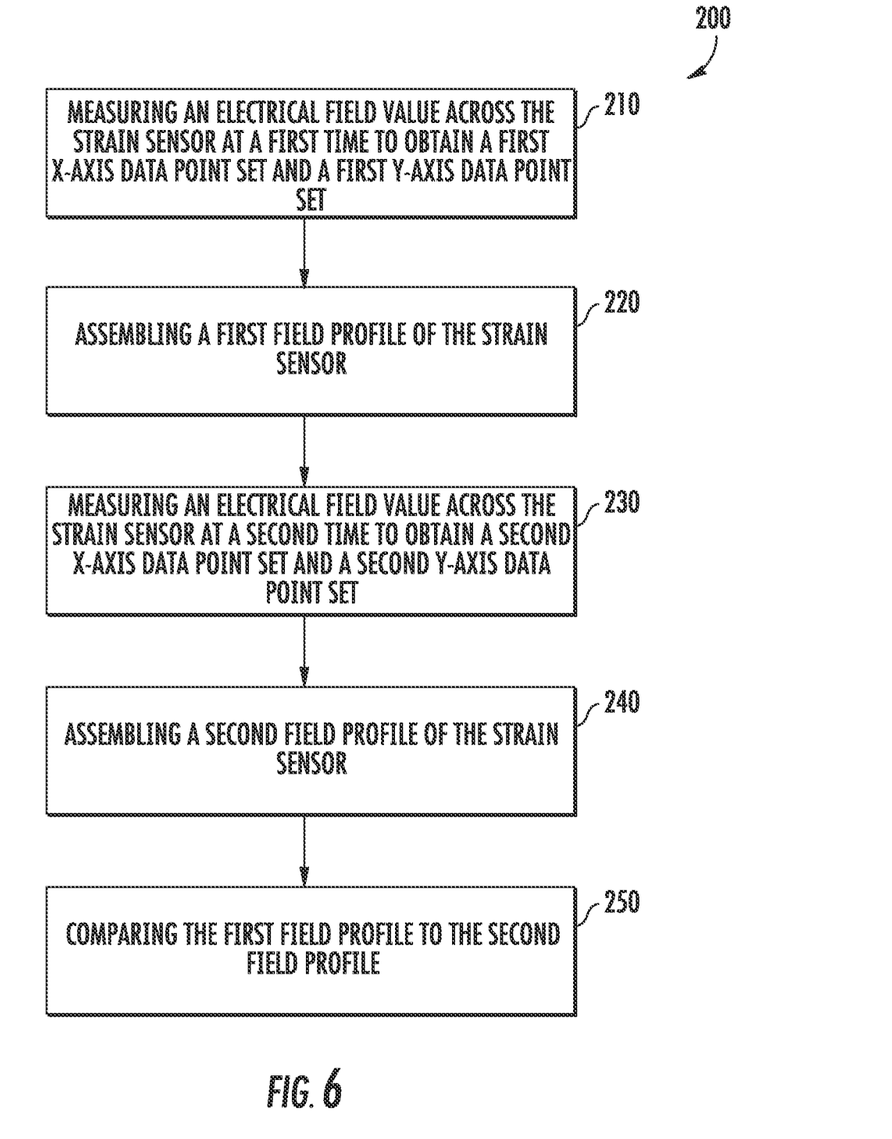
FIG. 6 is a flow chart illustrating a method for monitoring a component in accordance with one or more embodiments of the present disclosure.

As mentioned, and referring now to FIG. 6, the present disclosure is additionally directed to methods 200 for monitoring component 10 deformation. Such methods 200 in exemplary embodiment may be performed by processors 100, as discussed above. A method 200 may include, for example, the step 210 of measuring an electrical field value across a strain sensor 40 along a mutually-orthogonal X-axis and Y-axis to obtain a first data point set. In the exemplary embodiment of FIG. 6, the first data point set includes a X-axis data point set and a first Y-axis set. The measuring step 210 may include measuring an eddy current electrical field at an eddy current coil 70, measuring a Hall magnetic electrical field at a Hall Effect probe, measuring variations in capacitance at a capacitance probe, or measuring conductivity of a sensor 40 at a conductivity probe. As described above, measuring an eddy current field may additionally include alternating a current flow through the eddy current coil 70 and detecting and a secondary electromagnetic field.

The method 200 further includes the step 220 of assembling a first field profile of the strain sensor 40 based on the first data point set, e.g., the first X-axis data point set and the first Y-axis data point set. Optionally, the step 220 may include calculating a first Z-axis data point set in a Z-axis orthogonal to the X-axis and the Y-axis, the calculating being based on the first X-axis data point set and the first Y-axis data point set. In such embodiments, the step 230 may include assembling a first three-dimensional profile of the strain sensor 40 based on the first X-axis data point set, the first Y-axis data point set, and the first Z-axis data point set.

Step 210 may occur at a first time, and the field profile may be based on one or more of the X-axis data point set or the Y-axis data point set at the first time, as discussed above. Method embodiment 200 may, thus, further include, for example, the step 230 of measuring the strain sensor 40 along the X-axis and the Y-axis at a second time to obtain a second data point set, e.g., a second X-axis data point set and a second Y-axis data point set, as discussed above. The second time may be different from, and in exemplary embodiments after, the first time. Further, method 200 may include, for example, the step 240 of assembling a second field profile of the strain sensor 40 based on one or more of the X-axis data points or the Y-axis data points at the second time, as discussed above. Still further, method 200 may include, for example, the step 250 of comparing the first field profile and the second field profile, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring a turbine component, the system comprising:
    a strain sensor configured on the turbine component;
    an enclosed electrical field scanner for analyzing an electrical field of the strain sensor, wherein the electrical field scanner is removably disposed over the strain sensor at an exterior surface of the strain sensor; and
    a processor in operable communication with the electrical field scanner, the processor operable for:
        measuring the electrical field value across the strain sensor along a mutually-orthogonal X-axis and Y-axis to obtain a data point set, and
        assembling a field profile of the strain sensor based on the data point set.

2. The system of claim 1, wherein the electrical field scanner includes an eddy current coil.

3. The system of claim 1, wherein the electrical field scanner includes a Hall Effect probe.

4. The system of claim 1, wherein the electrical field scanner includes a conductivity probe.

5. The system of claim 1, wherein the electrical field scanner includes a capacitance probe.

6. The system of claim 1, wherein the processor is further operable for calculating one or more Z-axis data point in a Z-axis orthogonal to the X-axis and the Y-axis, and assembling a three-dimensional profile of the strain sensor based on the data set and the one or more Z-axis data point.

7. The system of claim 1, wherein the turbine component is formed from a material having a first conductivity value, and wherein the strain sensor comprises a detection material having a second conductivity value different from the first conductivity value.

8. The system of claim 7, wherein the second conductivity value of the detection material is greater than the first conductivity value of the turbine component.

9. The system of claim 1, wherein the turbine component comprises a base and a thermal barrier coating, and wherein the strain sensor is disposed between the base and the thermal barrier coating.

10. The system of claim 1, wherein the processor is further operable for comparing multiple field profiles.

11. A method for monitoring a turbine component, the method comprising:
    measuring an electrical field value of an electrical field of a strain sensor configured on the turbine component along a mutually-orthogonal X-axis and Y-axis to a first data point set, wherein measuring includes removably placing an electrical field scanner across the strain sensor along the X-axis and the Y-axis; and
    assembling a first field profile of the strain sensor based on the first data point set.

12. The method of claim 11, wherein the measuring step includes positioning the electrical field scanner parallel to the strain sensor in a Z-axis orthogonal to the X-axis and Y-axis.

13. The method of claim 11, further comprising calculating a first Z-axis data point in a Z-axis orthogonal to the X-axis and the Y-axis, the calculating being based on the first data point set, wherein assembling a first field profile includes assembling a first three-dimensional profile of the strain sensor based on the first data point set and the first Z-axis data point.

14. The method of claim 11, wherein the measuring step includes measuring an eddy current electrical field at an eddy current coil.

15. The method of claim 14, wherein the measuring step further includes
    alternating a current flow through the eddy current coil, thereby inducing an initial electromagnetic field, and
    detecting a secondary electromagnetic field, including an eddy current field generated at the strain sensor.

16. The method of claim 11, wherein the measuring step includes measuring a Hall magnetic electrical field at a Hall Effect probe.

17. The method of claim 11, wherein the measuring step includes measuring variations in conductivity at a conductivity probe.

18. The method of claim 11, wherein the measuring step includes measuring variations in capacitance at a capacitance probe.

19. The method of claim 11, wherein the measuring step occurs at a first time, and the method further comprises:
    measuring the strain sensor along the X-axis and the Y-axis at a second time to obtain a second data point set, the second time being different from the first time; and
    assembling a second field profile of the strain sensor based on the second data point set.

20. The method of claim 11, further comprising comparing the first field profile of the strain sensor to a second field profile of the strain sensor.

* * * * *